United States Patent
Shimura

(10) Patent No.: US 9,726,526 B2
(45) Date of Patent: Aug. 8, 2017

(54) FLOWMETER, INSULATION DETERIORATION DIAGNOSIS SYSTEM, AND INSULATION DETERIORATION DIAGNOSIS METHOD

(71) Applicant: YOKOGAWA ELECTRIC CORPORATION, Musashino-shi, Tokyo (JP)

(72) Inventor: Toru Shimura, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 115 days.

(21) Appl. No.: 14/753,104

(22) Filed: Jun. 29, 2015

(65) Prior Publication Data

US 2016/0011025 A1    Jan. 14, 2016

(30) Foreign Application Priority Data

Jul. 11, 2014    (JP) .................................. 2014-143174

(51) Int. Cl.
  *G01F 1/58*    (2006.01)
  *G01F 1/60*    (2006.01)
  *G01F 25/00*   (2006.01)

(52) U.S. Cl.
  CPC ............ *G01F 1/60* (2013.01); *G01F 25/0007* (2013.01); *G01F 1/58* (2013.01); *G01F 1/584* (2013.01); *G01F 1/586* (2013.01); *G01F 1/588* (2013.01)

(58) Field of Classification Search
  CPC ........................................................ G01F 1/58
  USPC .................................................... 73/861.12
  See application file for complete search history.

(56) References Cited

U.S. PATENT DOCUMENTS

| | | | | |
|---|---|---|---|---|
| 4,227,408 A * | 10/1980 | Schmoock | ............... | G01F 1/60 73/861.17 |
| 4,303,980 A * | 12/1981 | Yard | ........................ | G01F 1/60 702/49 |
| 4,373,400 A * | 2/1983 | Sekiguchi | ............... | G01F 1/60 73/861.12 |
| 4,651,286 A * | 3/1987 | Fukai | ....................... | G01F 1/60 702/45 |

(Continued)

FOREIGN PATENT DOCUMENTS

| | | |
|---|---|---|
| JP | 2-143121 A | 6/1990 |
| JP | 2002-195861 A | 7/2002 |

(Continued)

OTHER PUBLICATIONS

Foss, Scot R., Magnetic Flowmeter with Coil Ground Path Detection, WO2010101807, Sep. 10, 2010, 19 pages.*

(Continued)

*Primary Examiner* — Clayton E Laballe
*Assistant Examiner* — Kevin Butler
(74) *Attorney, Agent, or Firm* — Sughrue Mion, PLLC

(57) ABSTRACT

A flowmeter includes an exciter configured to excite fluid which is a measurement target, a state detector configured to detect a state of the fluid excited by the exciter, a driver configured to supply exciting current for driving the exciter, a first current detector that is disposed between the exciter and the driver, the first current detector being configured to detect the exciting current, and a processor configured to diagnose insulation deterioration of the exciter in accordance with a change of a detection result of the first current detector.

21 Claims, 7 Drawing Sheets

(56) References Cited

U.S. PATENT DOCUMENTS

| | | | | |
|---|---|---|---|---|
| 5,880,376 | A * | 3/1999 | Sai | G01F 1/002 |
| | | | | 73/861.08 |
| 6,845,330 | B2 * | 1/2005 | Okuda | G01F 1/60 |
| | | | | 702/100 |
| 6,847,901 | B2 * | 1/2005 | Suzuki | G01F 1/58 |
| | | | | 702/100 |
| 2010/0224008 | A1 * | 9/2010 | Foss | G01F 1/586 |
| | | | | 73/861.12 |
| 2011/0239778 | A1 * | 10/2011 | Mitsutake | G01F 1/60 |
| | | | | 73/861.12 |
| 2013/0289897 | A1 * | 10/2013 | Yamaguchi | G01F 1/588 |
| | | | | 702/45 |
| 2014/0033826 | A1 * | 2/2014 | Reichart | G01F 1/60 |
| | | | | 73/861.12 |

FOREIGN PATENT DOCUMENTS

| | | |
|---|---|---|
| JP | 2002-206956 A | 7/2002 |
| JP | 2003-097986 A | 4/2003 |
| JP | 2003-106879 A | 4/2003 |
| JP | 2003-177040 A | 6/2003 |
| JP | 2005-207984 A | 8/2005 |
| JP | 2007-225487 A | 9/2007 |
| JP | 2007-240231 A | 9/2007 |
| JP | 2008-020364 A | 1/2008 |
| JP | 2012-519849 A | 8/2012 |
| WO | 2010/101807 A1 | 9/2010 |

OTHER PUBLICATIONS

D.F. Warne, Newnes Electrical Power Engineer's Handbook 2nd Edition, Newnes, 2005, p. 74.*

* cited by examiner

FLOWMETER, INSULATION DETERIORATION DIAGNOSIS SYSTEM, AND INSULATION DETERIORATION DIAGNOSIS METHOD

BACKGROUND OF THE INVENTION

Field of the Invention

The disclosure relates to a flowmeter, an insulation deterioration diagnosis system, and an insulation deterioration diagnosis method.

Priority is claimed on Japanese Patent Application No. 2014-143174, filed Jul. 11, 2014, the contents of which are incorporated herein by reference.

Description of Related Art

A flowmeter is widely used for measuring flow quantity of liquid, gas, and other fluids. Various types of flowmeters are developed in accordance with properties and uses of the fluid which is a measurement target. An electromagnetic flowmeter is an example of these flowmeters. The electromagnetic flowmeter detects an electromotive force generated by applying a magnetic field to the fluid (an electromotive force proportional to flow velocity) so that the electromagnetic flowmeter measures flow quantity of the fluid.

The electromagnetic flowmeter is mounted on a pipe in which the fluid flows. The electromagnetic flowmeter is equipped with a detector which has an exciting coil and detecting electrodes. The exciting coil generates a magnetic field which is applied to the fluid. The detecting electrodes detect the electromotive force generated in the fluid. In a case that an insulation of the exciting coil in the detector deteriorates, a magnitude of the magnetic field is changed. In this case, even if the flow quantity of the fluid is not changed, the electromotive force generated in the fluid is changed. For the reason, the electromagnetic flowmeter measures improper flow quantity. So as to prevent from measuring improper flow quantity, the electromagnetic flowmeter performs an insulation deterioration diagnosis of the exciting coil.

In Japanese Unexamined Patent Application Publication No. 2008-020364, Japanese Unexamined Patent Application Publication No. 2007-240231, Japanese Unexamined Patent Application Publication No. 2007-225487, Japanese Unexamined Patent Application Publication No. 2005-207984, Japanese Unexamined Patent Application Publication No. 2003-177040, Japanese Unexamined Patent Application Publication No. 2003-106879, Japanese Unexamined Patent Application Publication No. 2003-097986, and Japanese Unexamined Patent Application Publication No. 2002-195861, an electromagnetic flowmeter which has a function of an insulation deterioration diagnosis of an exciting coil is disclosed. For example, in Japanese Unexamined Patent Application Publication No. 2008-020364, an electromagnetic flowmeter which diagnoses insulation deterioration in accordance with a change in inductance of an exciting coil is disclosed. For example, in Japanese Unexamined Patent Application Publication No. 2005-207984, so as to omit a dedicated signal line for the insulation deterioration diagnosis, an electromagnetic flowmeter, which superimposes a signal for the insulation deterioration diagnosis with a measurement signal of the flow quantity, is disclosed.

As described above, the detector of the electromagnetic flowmeter is mounted on the pipe in which the fluid flows. For the reason, in a case of exchanging or changing the detector, there is a need to empty the pipe by stopping the flow of the fluid in the pipe. Therefore, it is difficult to exchange or change the detector easily. In a case that the flow of the fluid is stopped so as to exchange or change the detector, there is a possibility that a large opportunity loss occurs in a plant and a factory.

Because it is difficult to exchange and change the detector easily, for example, there is a problem that it is difficult to add a configuration necessary for the insulation deterioration diagnosis in the detector mounted on the pipe, or it is difficult that the detector mounted on the pipe is exchanged to another detector having a configuration necessary for the insulation deterioration diagnosis. The problem is not limited to the electromagnetic flowmeter, and the problem may occur in other flowmeters (for example, a Coriolis-type mass flowmeter required to excite a tube in which fluid flows).

SUMMARY

A flowmeter may include an exciter configured to excite fluid which is a measurement target, a state detector configured to detect a state of the fluid excited by the exciter, a driver configured to supply exciting current for driving the exciter, a first current detector that is disposed between the exciter and the driver, the first current detector being configured to detect the exciting current, and a processor configured to diagnose insulation deterioration of the exciter in accordance with a change of a detection result of the first current detector.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a flowmeter, an insulation deterioration diagnosis system, and an insulation deterioration diagnosis method which can diagnosis insulation deterioration without drastically changing a configuration.

The flowmeter, the insulation deterioration diagnosis system, and the insulation deterioration diagnosis method of the present embodiment will be described below with reference to drawings.

First Embodiment

Figure 1:
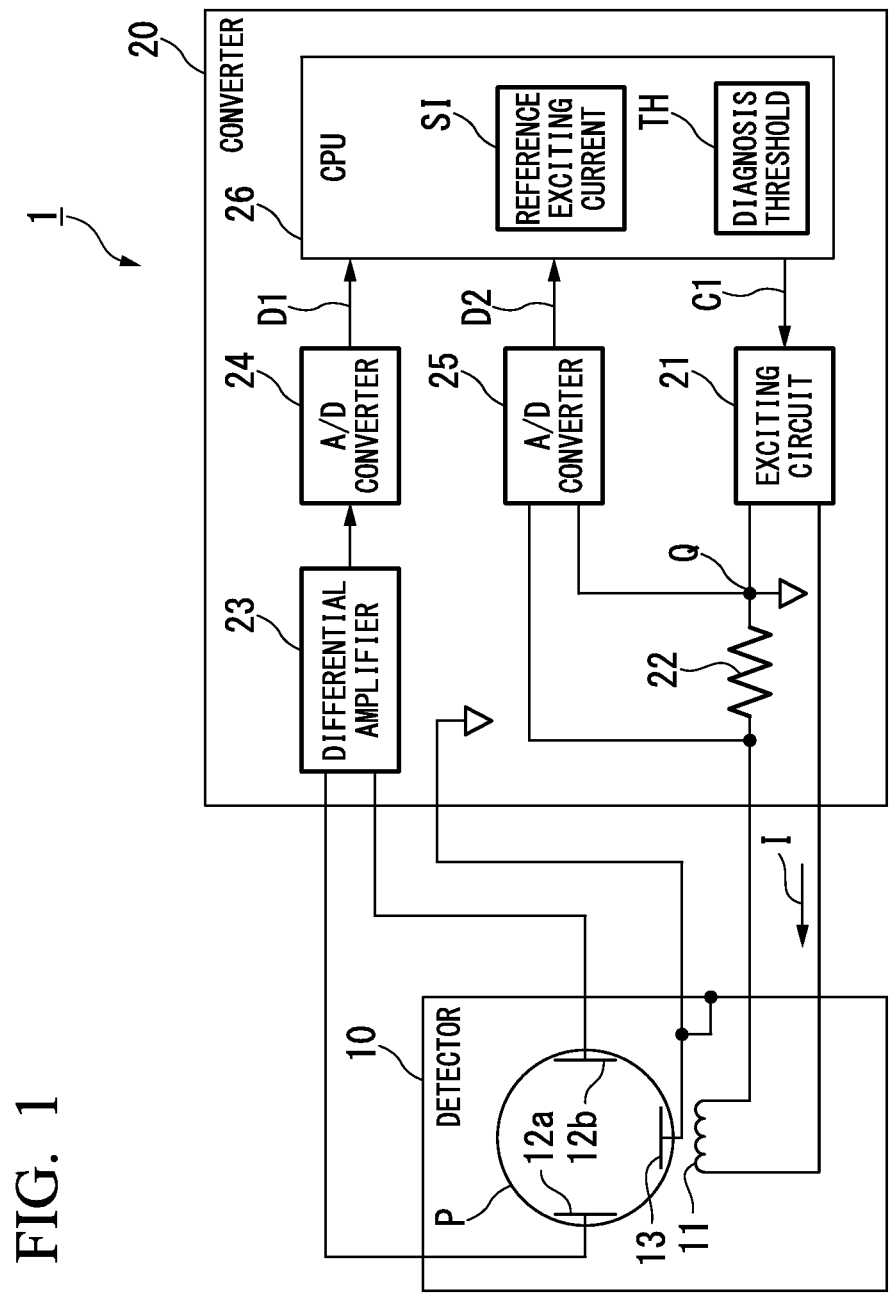
FIG. 1 is a block diagram illustrating a main part of the flowmeter in the first embodiment.

FIG. 1 is a block diagram illustrating a main part of the flowmeter in the first embodiment. As shown in FIG. 1, the flowmeter 1 of the present embodiment is an electromagnetic flowmeter which has a detector 10 and a converter 20. The flowmeter 1 detects an electromotive force generated by applying a magnetic field to fluid which is a measurement target (an electromotive force proportional to flow velocity) so that the electromagnetic flowmeter measures flow quantity of the fluid.

The detector 10 is mounted on a measurement pipe P which is a pipe in which the fluid (measurement target) flows. The detector 10 applies the magnetic field to the fluid flowing in the measurement pipe P, and the detector 10 detects the electromotive force which is generated by the applied magnetic field. The detector 10 has an exciting coil 11 (exciter), detecting electrodes 12a and 12b (state detector), and a reference electrode 13. The exciting coil 11 is mounted on the outside of the measurement pipe P. The exciting coil 11 is excited by an exciting current I from the converter 20 so that the exciting coil 11 generates the magnetic field which is applied to the fluid flowing in the measurement pipe P. For example, a plurality of exciting coils may be mounted on the measurement pipe P so as to sandwich the measurement pipe P.

The detecting electrodes 12a and 12b are electrodes for detecting the electromotive force generated by applying the magnetic field to the fluid flowing in the measurement pipe P. The detecting electrode 12a and 12b are mounted in the measurement pipe P so as to sandwich a center axis of the measurement pipe P. The reference electrode 13 is an electrode for prescribing a reference electrical potential with respect to the detecting electrodes 12a and 12b. As is the case with the detecting electrode 12a and 12b, the reference electrode 13 is mounted in the measurement pipe P. An electromotive force detected by the detecting electrodes 12a is an electromotive force generated between the detecting electrodes 12a and the reference electrode 13. An electromotive force detected by the detecting electrodes 12b is an electromotive force generated between the detecting electrodes 12b and the reference electrode 13. As shown in FIG. 1, the reference electrode 13 is connected to a body of the detector 10 and the ground of the converter 20.

The converter 20 has an exciting circuit 21 (driver), a current detecting resistance 22 (first current detector), a differential amplifier 23, an A/D (analog/digital) converter 24, an A/D converter 25, and a CPU (Central Processing Unit) 26 (processor). The converter 20 supplies the exciting current I to the detector 10. The converter 20 measures the flow quantity of the fluid flowing in the measurement pipe P in accordance with the electromotive force detected by the detecting electrodes 12a and 12b. The converter 20 diagnoses the insulation deterioration of the exciting coil 11 in the detector 10 by using a detection result of the current detecting resistance 22.

The exciting circuit 21 is connected to the exciting coil 11 in the detector 10 via the current detecting resistance 22. The exciting circuit 21 generates the exciting current I, which is to be supplied to the detector 10, in accordance with an exciting control signal C1 output from the CPU 26. Although details will be described later, the exciting circuit 21 supplies the exciting current I to the exciting coil 11 at a predetermined exciting frequency (for example, from several [Hz] to a hundred and several tens [Hz]) in a positive direction and a negative direction alternately (alternately performs a positive exciting and a negative exciting of the exciting coil 11). The exciting circuit 21 supplies the exciting current I so that the exciting current I of the positive exciting and the exciting current I of the negative exciting are made equal.

The current detecting resistance 22 is disposed between the exciting circuit 21 and the exciting coil 11 in the detector 10. The current detecting resistance 22 detects the exciting current I which is supplied from the exciting circuit 21 to the exciting coil 11. Although details will be described later, in a case that the insulation deterioration of the exciting coil 11 occurs, a part of the exciting current I flows through another path not via the current detecting resistance 22. For the reason, the exciting current I from which the part of the exciting current I is removed is detected by the current detecting resistance 22.

A connecting point Q between the exciting circuit 21 and the current detecting resistance 22 is connected to the ground. As described above, the reference electrode 13 in the detector 10 is connected to the ground of the converter 20. Therefore, the connecting point Q between the exciting circuit 21 and the current detecting resistance 22 is equal in electrical potential to the reference electrode 13.

The differential amplifier 23 is connected to the detecting electrodes 12a and 12b in the detector 10. The differential amplifier 23 outputs a signal, which represents a difference between the electromotive force detected by the detecting electrode 12a and the electromotive force detected by the detecting electrode 12b, to the A/D converter 24. The A/D converter 24 converts the signal, which is output from the differential amplifier 23, to a digital signal. The A/D converter 24 outputs electromotive force data D1, which represents the difference between the electromotive forces detected by the detecting electrodes 12a and 12b, to the CPU 26. The A/D converter 25 converts the exciting current I detected by the current detecting resistance 22 (exactly, voltage generated by the exciting current I flowing through the current detecting resistance 22) to a digital signal. The A/D converter 25 outputs exciting current data D2, which represents the exciting current I flowing through the current detecting resistance 22, to the CPU 26.

The CPU 26 outputs the exciting control signal C1 to the exciting circuit 21, and the CPU 26 controls the exciting current I which is applied to the exciting coil 11. The CPU 26 measures the flow quantity of the fluid flowing in the measurement pipe P by using the electromotive force data D1 output from the A/D converter 24. The CPU 26 performs a correction process for correcting the measured flow quantity by using the exciting current data D2 output from the A/D converter 25. If the exciting current I is changed, the magnetic field applied to the fluid is changed, and flow quantity of the fluid is improperly y measured. For the reason, in a case that the exciting current I is changed, the CPU 26 corrects the measured flow quantity of the fluid by using the exciting current data D2.

The CPU 26 diagnoses the insulation deterioration of the exciting coil 11 in the detector 10 in accordance with a change of the exciting current data D2. Specifically, the CPU 26 stores a reference exciting current SI (reference exciting current) and a predetermined diagnosis threshold TH (threshold). The reference exciting current SI represents the exciting current I which is supplied to the exciting coil 11 when the insulation deterioration does not occur. In a case that the difference between the exciting current data D2 and the reference exciting current SI exceeds the diagnosis threshold TH, the CPU 26 diagnoses the insulation deterioration of the exciting coil 11. The CPU 26 performs the diagnosis in both cases of performing the positive exciting and performing the negative exciting. Otherwise, the CPU 26 may diagnose in accordance with a difference between the positive exciting and the negative exciting. In a case that the CPU 26 determines that the insulation deterioration occurs, the CPU 26 output the diagnosis result as an alarm. Even if the CPU 26 does not perform the correction process, the CPU 26 can inform an abnormal state to the outside of the flowmeter 1.

Figure 2:
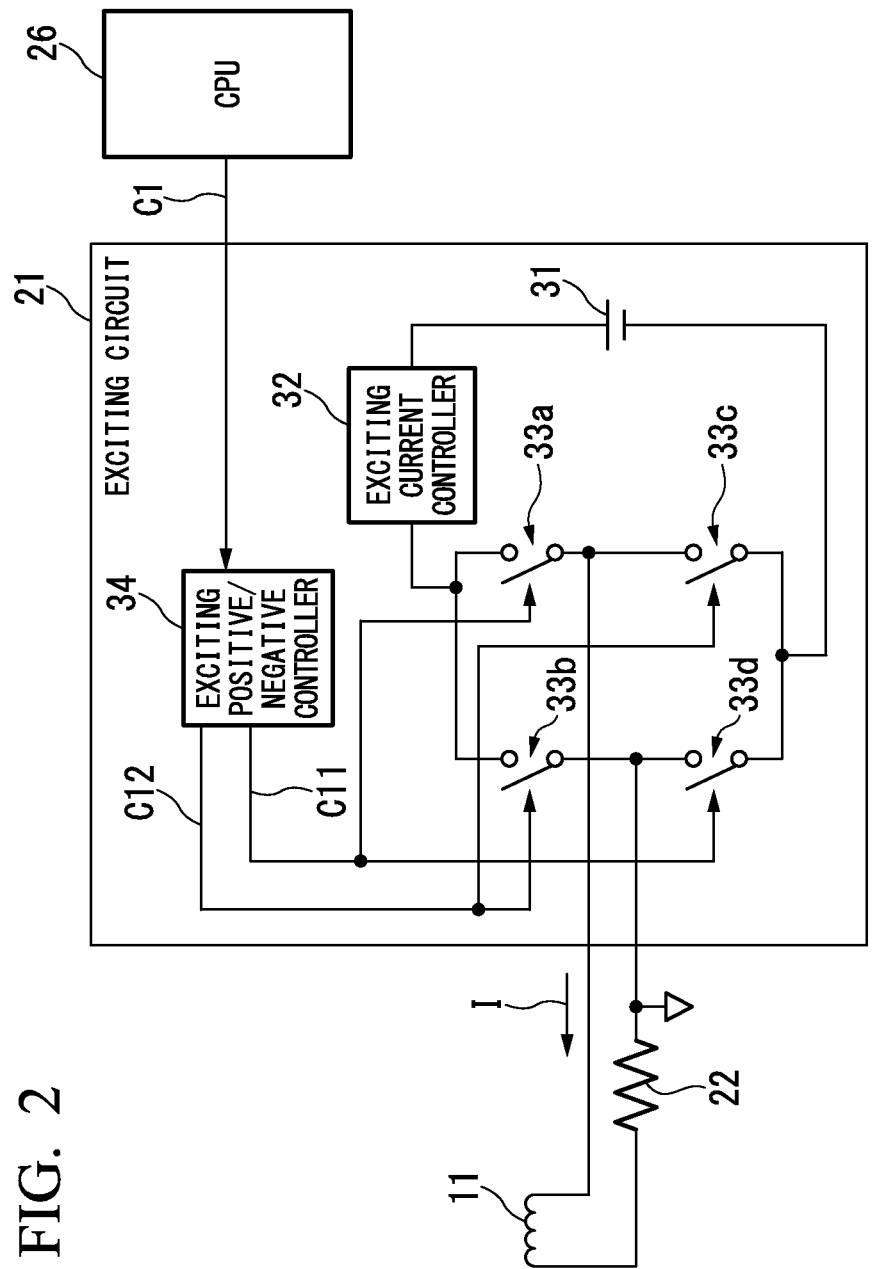
FIG. 2 is a drawing illustrating an inner configuration of the exciting circuit in the first embodiment.

FIG. 2 is a drawing illustrating an inner configuration of the exciting circuit in the first embodiment. In FIG. 2, out of the structure elements shown in FIG. 1, structure elements necessary for describing the exciting circuit 21 (the exciting coil 11, the current detecting resistance 22, and the CPU 26) are illustrated. As shown in FIG. 2, the exciting circuit 21 has an exciting power source 31, an exciting current controller 32, switches 33*a* to 33*d*, and an exciting positive/negative controller 34.

The exciting power source 31 is a DC (direct-current) power source which supplies electrical power necessary for supplying the exciting current I to the exciting coil 11 in the detector 10. The exciting current controller 32 is connected to a positive terminal of the exciting power source 31. The exciting current controller 32 performs a control for making the magnitude (absolute value) of the exciting current I which is supplied to the exciting coil 11 be constant. Specifically, the exciting current controller 32 has a current detecting resistance (not shown) and a current controller. The current detecting resistance detects the current flowing through the exciting power source 31. The current controller performs the control for making the current be constant in accordance with the detection result of the current detecting resistance.

The switches 33*a* to 33*d* are disposed for switching whether the exciting current I flows in the exciting coil 11 in a positive direction (a positive excitation of the exciting coil 11 is performed) or the exciting current I flows in the exciting coil 11 in a negative direction (a negative excitation of the exciting coil 11 is performed). Specifically, the switches 33*a* and 33*c* are connected in series, and the switches 33*b* and 33*d* are connected in series. These circuits, which are connected in series, are connected between the exciting current controller 32 and a negative electrode of the exciting power source 31. One end of the exciting coil 11 is connected to a connecting point of the switches 33*a* and 33*c*. The other end of the exciting coil 11 is connected to a connecting point of the switches 33*b* and 33*d* via the current detecting resistance 22.

For example, these switches 33*a* to 33*d* are electronic switches such as a bipolar transistor, FET (Field Effect Transistor), or the like. The switches 33*a* to 33*d* are switched to an ON-state or an OFF-state by positive/negative control signals C11 and C12 which are output from the exciting positive/negative controller 34. For example, in a case that the positive/negative control signal C11 is "H (High)" level, the switches 33*a* and 33*d* become the ON-state, in a case that the positive/negative control signal C11 is "L (Low)" level, the switches 33*a* and 33*d* become the OFF-state. In a case that the positive/negative control signal C12 is "H" level, the switches 33*b* and 33*c* become the ON-state, in a case that the positive/negative control signal C12 is "L" level, the switches 33*b* and 33*c* become the OFF-state.

The exciting positive/negative controller 34 outputs the positive/negative control signals C11 and C12 in accordance with the exciting control signal C1 from the CPU 26, so that the exciting positive/negative controller 34 selectively performs any one of the positive excitation of the exciting coil 11 and the negative excitation of the exciting coil 11. As a specific example, in a case that the exciting positive/negative controller 34 performs the positive excitation of the exciting coil 11, the exciting positive/negative controller 34 outputs the positive/negative control signal C11 of the "H" level and the positive/negative control signal C12 of the "L" level. On the other hand, in a case that the exciting positive/negative controller 34 performs the negative excitation of the exciting coil 11, the exciting positive/negative controller 34 outputs the positive/negative control signal C11 of the "L" level and the positive/negative control signal C12 of the "H" level. In FIG. 2, although the exciting control signal C1 is illustrated as a signal, the exciting control signal C1 may be a plurality of signals in conformity to a control method of the positive/negative control signals C11 and C12.

Figure 3A:
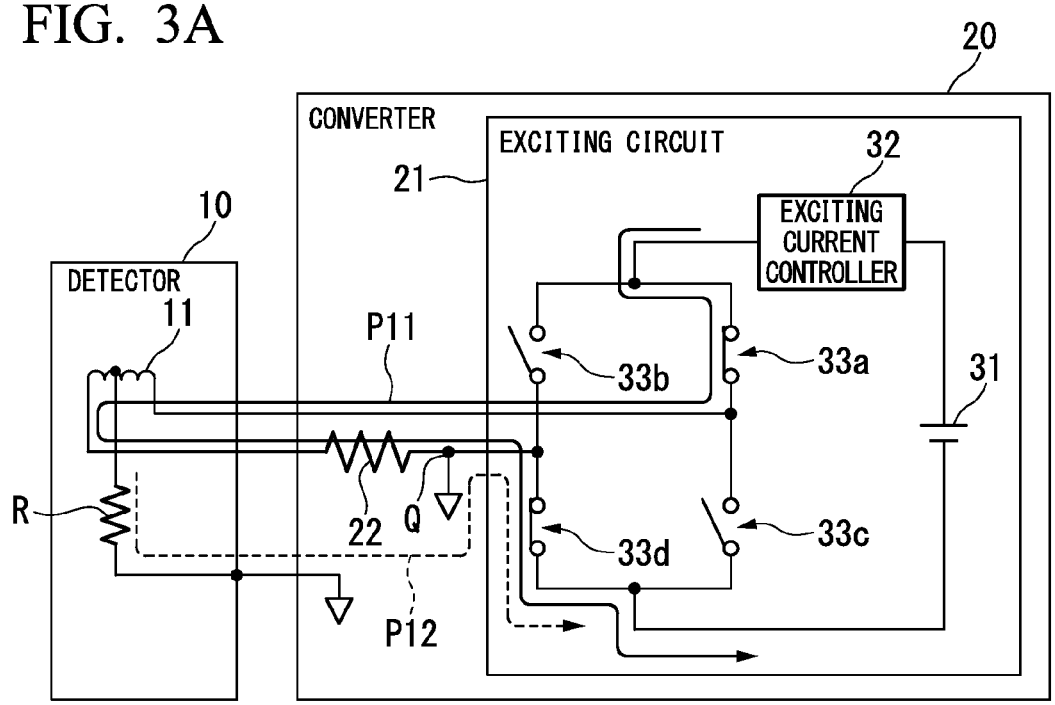
FIG. 3A is a drawing illustrating a current path of the exciting current in the first embodiment in a case that the positive excitation is performed.
Figure 3B:
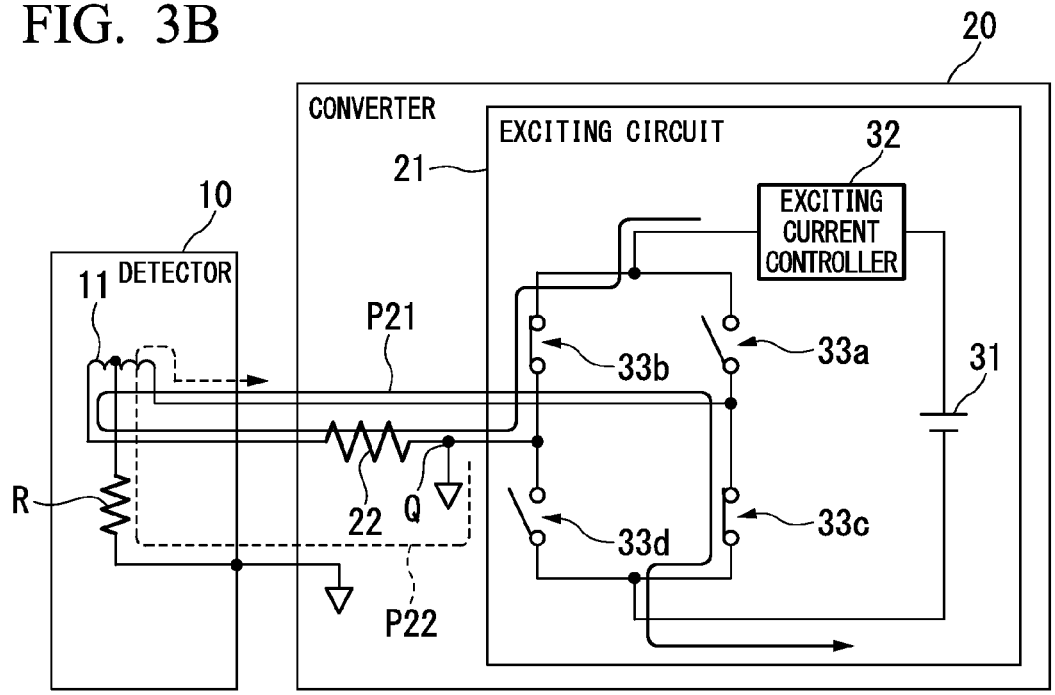
FIG. 3B is a drawing illustrating a current path of the exciting current in the first embodiment in a case that the negative excitation is performed.
Figure 4A:
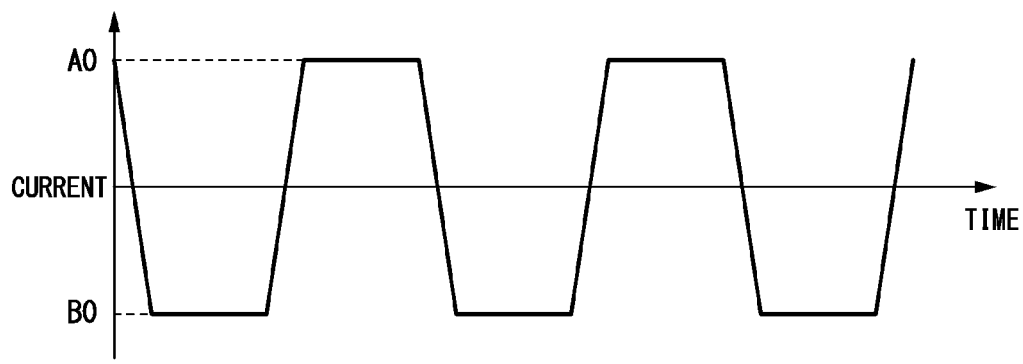
FIG. 4A is a drawing illustrating an exemplary waveform of the exciting current in the first embodiment in the normal time.
Figure 4B:
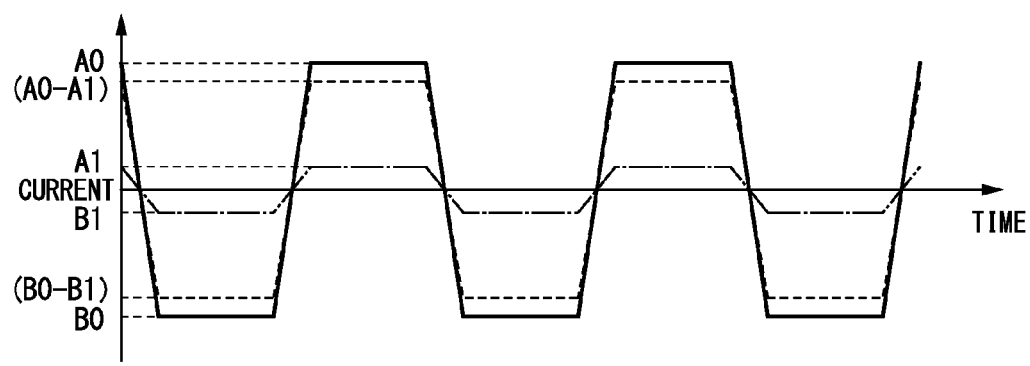
FIG. 4B is a drawing illustrating an exemplary waveform of the exciting current in the first embodiment when the insulation deterioration occurs.

Next, an operation of the flowmeter 1 will be described. In the following, first, in a case that the insulation deterioration of the exciting coil 11 disposed in the detector 10 does not occur, an operation of the flowmeter 1 (operation at normal time) will be described. Next, in a case that the insulation deterioration of the exciting coil 11 disposed in the detector 10 occurs, an operation of the flowmeter 1 (operation when the insulation deterioration occurs) will be described. FIG. 3A is a drawing illustrating a current path of the exciting current in the first embodiment in a case that the positive excitation is performed. FIG. 3B is a drawing illustrating a current path of the exciting current in the first embodiment in a case that the negative excitation is performed. FIG. 4A is a drawing illustrating an exemplary waveform of the exciting current in the first embodiment in the normal time. FIG. 4B is a drawing illustrating an exemplary waveform of the exciting current in the first embodiment when the insulation deterioration occurs.

<Operations in a Case of Normal State>

When the operation is started, the CPU 26 outputs the exciting control signal C1 to the exciting positive/negative controller 34 in the exciting circuit 21 (referring to FIG. 2). When the exciting control signal C1 is input to the exciting positive/negative controller 34, the exciting positive/negative controller 34 outputs the positive/negative control signals C11 and C12, of which levels are alternately changed at a predetermined exciting frequency, to the switches 33*a* to 33*d*. Thereby, the positive excitation of the exciting coil 11 and the negative excitation of the exciting coil 11 are alternately performed.

Specifically, in a case that the positive excitation of the exciting coil 11 is performed, the exciting positive/negative controller 34 outputs the positive/negative control signal C11 of the "H" level and the positive/negative control signal C12 of the "L" level. As shown in FIG. 3A, the switches 33*a* and 33*d* become the ON-state, and the switches 33*b* and 33*c* become the OFF-state. Thereby, the exciting current I flows through the current path P11 shown in FIG. 3A.

In other words, the exciting current I flows from a positive electrode of the exciting power source 31 via the exciting current controller 32, the switch 33a, the exciting coil 11, the current detecting resistance 22, and the switch 33d, thereafter the exciting current I flows to a negative electrode of the exciting power source 31. The exciting current I is a current supplied to the exciting coil 11 in a positive direction. When the exciting current I flows, a current value A0 of the exciting current I (the exciting current data D2 input to the CPU 26) is detected by the current detecting resistance 22.

On the other hand, in a case that the negative excitation of the exciting coil 11 is performed, the exciting positive/negative controller 34 outputs the positive/negative control signal C11 of the "L" level and the positive/negative control signal C12 of the "H" level. As shown in FIG. 3B, the switches 33a and 33d become the OFF-state, and the switches 33b and 33c become the ON-state. Thereby, the exciting current I flows through the current path P21 shown in FIG. 3B.

In other words, the exciting current I flows from a positive electrode of the exciting power source 31 via the exciting current controller 32, the switch 33b, the current detecting resistance 22, the exciting coil 11, and the switch 33c, thereafter the exciting current I flows to a negative electrode of the exciting power source 31. The exciting current I is a current supplied to the exciting coil 11 in a negative direction. When the exciting current I flows, a current value B0 of the exciting current I (the exciting current data D2 input to the CPU 26) is detected by the current detecting resistance 22.

In both cases of the positive excitation and the negative excitation, the exciting current controller 32 detects the exciting current I by using the current detecting resistance (not shown) disposed in the exciting current controller 32, and the exciting current controller 32 controls the exciting current I to be constant in accordance with the detection result. For the reason, during normal operation, the current value A0 of the exciting current I, which is obtained when the positive excitation is performed, is equivalent to the current value B0 of the exciting current I, which is obtained when the negative excitation is performed. Therefore, in a case that the insulation deterioration of the exciting coil 11 does not occur, as shown in FIG. 4A, the absolute value of the exciting current I is constant, a polar character of the exciting current I is changed at a predetermined frequency. The exciting current I having such characteristics flows through the current detecting resistance 22.

In this way, if the positive excitation of the exciting coil 11 and the negative excitation of the exciting coil 11 are alternately performed, a magnetic field in accordance with the exciting current I of the positive direction (referring to FIG. 3A) and a magnetic field in accordance with the exciting current I of the negative direction (referring to FIG. 3B) are alternately applied to the fluid flowing in the measurement pipe P. Thereby, the electromotive force is generated in the measurement pipe P. The electromotive force is proportional to a product of the magnitude of the magnetic field applied by the exciting coil 11 (magnetic flux density) and an average flow velocity of the fluid.

The electromotive force generated in the measurement pipe P (electromotive force based on the electrical potential of the reference electrode 13) is detected by the detecting electrodes 12a and 12b. A signal representing a difference between the electromotive force detected by the detecting electrodes 12a and the electromotive force detected by the detecting electrodes 12b is output from the differential amplifier 23. The signal output from the differential amplifier 23 is converted to a digital signal by the A/D converter 24, and the converted data is output to the CPU 26 as the electromotive force data D1. Thereafter, the CPU 26 calculates the flow quantity of the fluid by using the electromotive force data D1. Specifically, the CPU 26 calculates the average flow velocity of the fluid in accordance with the electromotive force data D1. Thereafter, the CPU 26 calculates the flow quantity of the fluid by multiplying a section area of the measurement pipe P to the calculated average flow velocity of the fluid.

While the operations described above are performed, the exciting current I supplied to the exciting coil 11 is detected by the current detecting resistance 22. The detection result of the current detecting resistance 22 is converted to a digital signal by the A/D converter 25, and the converted data is output to the CPU 26 as the exciting current data D2. Thereafter, the CPU 26 corrects the flow quantity of the fluid, which is calculated in the operations described above, by using the exciting current data D2. In this way, the flow quantity of the fluid is measured.

In parallel with the processes described above, the CPU 26 calculates a difference between the exciting current data D2 and the reference exciting current SI, and the CPU 26 determines whether the difference exceeds the diagnosis threshold TH or not. Specifically, the CPU 26 determines whether both of a difference between the exciting current data D2 representing the current value A0 and the reference exciting current SI and a difference between the exciting current data D2 representing the current value B0 and the reference exciting current SI exceed the diagnosis threshold TH or not. During normal operation, the CPU 26 determined that the difference between the exciting current data D2 and the reference exciting current SI does not exceed the diagnosis threshold TH. Thereby, it is diagnosed that the insulation deterioration of the exciting coil 11 does not occur.

<Operations in a Case of Insulation Deterioration>

In a case that the insulation deterioration of the exciting coil 11 occurs by a factor such as the fluid flowing into the detector 10, as shown in FIG. 3A and FIG. 3B, the exciting coil 11 is electrically connected to a housing of the detector 10 via the resistance R. For example, the resistance R is an electric resistance of an insulator in which the insulation deterioration occurs (an insulator used for insulating the exciting coil 11 from the housing). Thereafter, as shown in FIG. 3A and FIG. 3B, a part of the exciting current I flows through the current paths P12 and P22 which are different from the current paths P11 and P21.

Specifically, in a case that the positive excitation of the exciting coil 11 is performed, as shown in FIG. 3A, a part of the exciting current I which is supplied to the exciting coil 11 flows through the current path P12. The current path P12 is a current path sequentially passing through the resistance R, the ground of the converter 20, the connecting point Q (the connecting point between the exciting circuit 21 and the current detecting resistance 22), and the switch 33d. In a case that the negative excitation of the exciting coil 11 is performed, as shown in FIG. 3B, a part of the exciting current I which is supplied to the exciting coil 11 flows through the current path P22. The current path P22 is a current path sequentially passing through the connecting point Q, the ground of the converter 20, the resistance R, and the exciting coil 11.

As shown in FIG. 3A and FIG. 3B, the exciting current I which flows through the current paths P12 and the exciting current I which flows through P22 do not flow through the current detecting resistance 22. For the reason, in a case that the positive excitation of the exciting coil 11 is performed, the current value of the exciting current I detected by the current detecting resistance 22 is the same as the current value A0 in the case of normal state, from which the current value of the exciting current I flowing through the current path P12 is subtracted. In a case that the negative excitation of the exciting coil 11 is performed, the current value of the exciting current I detected by the current detecting resistance 22 is the same as the current value B0 in the case of normal state, from which the current value of the exciting current I flowing through the current path P22 is subtracted.

A current value A1 is a current value of the exciting current I flowing through the current path P12. A current value B1 is a current value of the exciting current I flowing through the current path P22. In a case that the insulation deterioration of the exciting coil 11 occurs, as shown in FIG. 4B, the polar character of the exciting current I is changed at the predetermined exciting frequency (exciting frequency which is the same frequency as the exciting current shown in FIG. 4A). In a case that the positive excitation of the exciting coil 11 is performed, the exciting current I of which current value is represented as (A0-A1) flows through the current detecting resistance 22. On the other hand, in a case that the negative excitation of the exciting coil 11 is performed, the exciting current I of which current value is represented as (B0-B1) flows through the current detecting resistance 22.

If the change described above (the change of the exciting current I flowing through the current detecting resistance 22) occurs, the CPU 26 determines that the difference between the exciting current data D2 and the reference exciting current SI exceeds the diagnosis threshold TH. Thereby, it is diagnosed that the insulation deterioration of the exciting coil 11 occurs. If it is diagnosed that the insulation deterioration of the exciting coil 11 occurs, the CPU 26 outputs the diagnosis result as an alarm. The CPU 26 does not perform the correction process (the process of correcting the flow quantity of the fluid by using the exciting current data D2) so that the CPU 26 can inform an abnormal state to outside.

As described above, in the present embodiment, the CPU 26 calculates the difference between the exciting current data D2, which represents the exciting current I flowing through the current detecting resistance 22 connected to the exciting coil 11, and the predetermined reference exciting current SI. Thereafter, the CPU 26 determines whether the insulation deterioration of the exciting coil 11 occurs or not, in accordance with whether the difference exceeds the diagnosis threshold TH or not. So as to diagnose the insulation deterioration of the exciting coil 11, it is enough just to change the program executed by the CPU 26. For the reason, in the present embodiment, the insulation deterioration can be diagnosed without drastically changing configurations.

Second Embodiment

Figure 5:
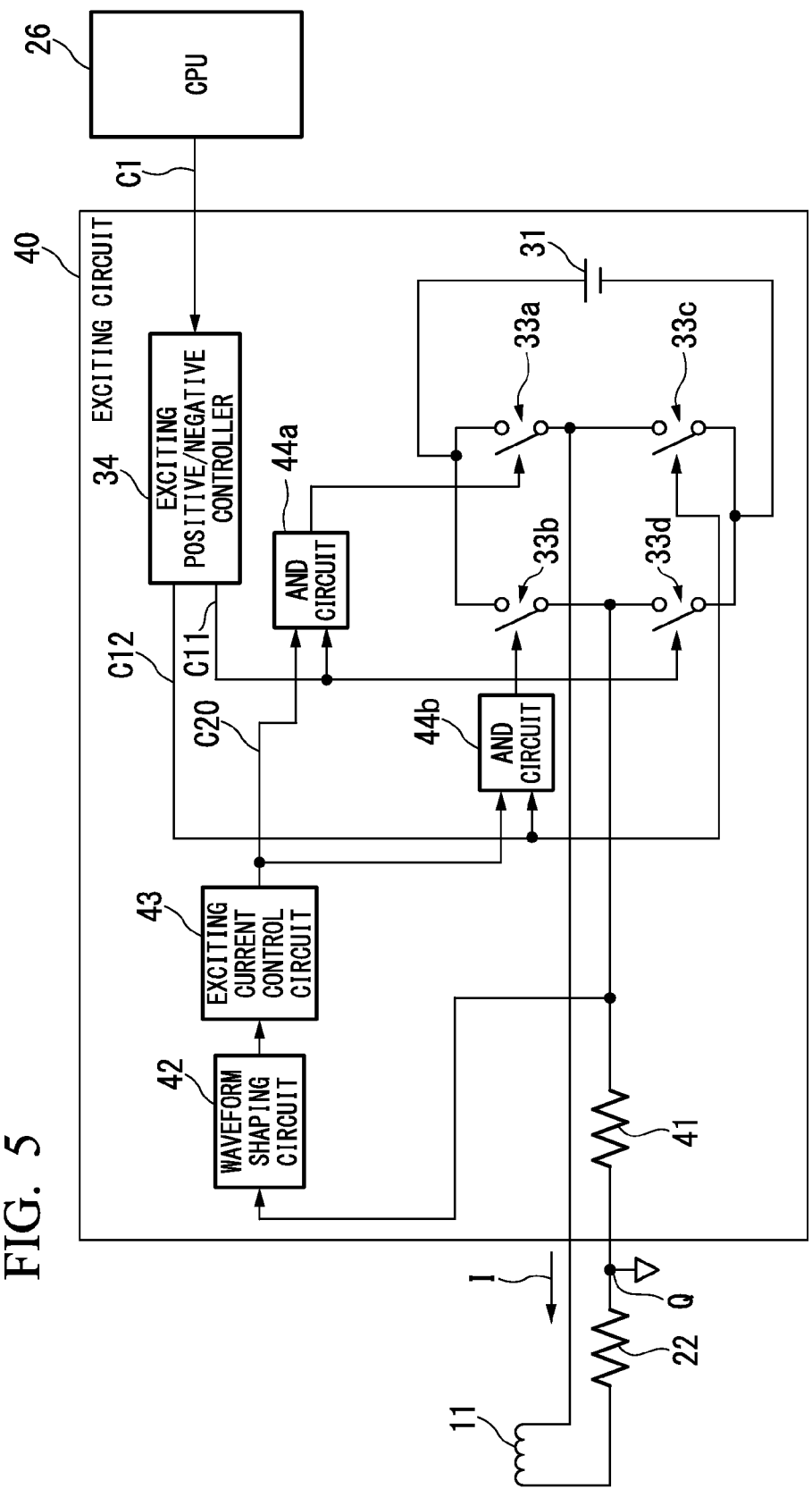
FIG. 5 is a drawing illustrating an inner configuration of the exciting circuit disposed in the flowmeter in the second embodiment.

FIG. 5 is a drawing illustrating an inner configuration of the exciting circuit disposed in the flowmeter in the second embodiment. Although the flowmeter in the present embodiment is approximately the same configuration as the flowmeter 1 shown in FIG. 1, an exciting circuit 40 shown in FIG. 5 is disposed instead of the exciting circuit 21 in the flowmeter 1, and the exciting current I flowing through the exciting coil 11 is controlled by PWM (Pulse Width Modulation) control. In FIG. 5, parts that correspond to those in FIG. 2 are assigned the same reference numerals, and the descriptions thereof will be omitted.

As shown in FIG. 5, the exciting circuit 40 does not have the exciting current controller 32 in the exciting circuit 21 shown in FIG. 2. The exciting circuit 40 has a current detecting resistance 41 (second current detector), a waveform shaping circuit 42, an exciting current control circuit 43 (current controller), an AND circuit 44a, and an AND circuit 44b. The current detecting resistance 41 is disposed so as to control the exciting current I flowing through the exciting coil 11 by the PWM control. One end of the current detecting resistance 41 is connected to the connecting point between the switch 33b and the switch 33d, and the other end of the current detecting resistance 41 is connected to one end of the current detecting resistance 22 (the connecting point Q).

Referring to FIG. 3, in both cases of the positive excitation and the negative excitation, whole of the exciting current I flowing from the positive electrode of the exciting power source 31 flows in the position where the current detecting resistance 41 is disposed (the position between the connecting point between the switch 33b and the switch 33d and the connecting point Q). For the reason, even if the insulation deterioration of the exciting coil 11 occurs, the exciting current flowing through the exciting coil 11 can be controlled to be constant by using the current detecting resistance 41.

The waveform shaping circuit 42 shapes the waveform of the signal detected by the current detecting resistance 41 (voltage signal generated by the exciting current flowing through the current detecting resistance 41). The exciting current control circuit 43 generates a PWM control signal C20 for keeping the exciting current I constant, and the exciting current control circuit 43 outputs the generated PWM control signal C20 to the AND circuit 44a. The frequency of the PWM control signal C20 is higher than the exciting frequency of the exciting current I. For example, the frequency of the PWM control signal C20 may be one hundred times higher than the exciting frequency of the exciting current I. The AND circuit 44a calculates a logical product of the positive/negative control signal C11 from the exciting positive/negative controller 34 and the PWM control signal C20 from the exciting current control circuit 43, and the AND circuit 44a outputs the calculated logical product to the switch 33a. The AND circuit 44b calculates a logical product of the positive/negative control signal C12 from the exciting positive/negative controller 34 and the PWM control signal C20 from the exciting current control circuit 43, and the AND circuit 44b outputs the calculated logical product to the switch 33b.

Next, operations of the exciting circuit 40 will be briefly described. When the exciting control signal C1 is output from the CPU 26, as is the case with the first embodiment, the exciting positive/negative controller 34 outputs the positive/negative control signals C11 and C12 of which levels are alternately changed at a predetermined exciting frequency. Thereby, the positive excitation of the exciting coil 11 and the negative excitation of the exciting coil 11 are alternately performed. In both cases of the positive excitation and the negative excitation, the exciting current control circuit 43 outputs the PWM control signal C20, which has a duty ratio in accordance with the signal detected by the current detecting resistance 41, to the AND circuit 44a. The AND circuit 44a calculates a logical product of the positive/negative control signal C11 and the PWM control signal C20. The AND circuit 44b calculates a logical product of the positive/negative control signal C12 and the PWM control signal C20.

Thereby, in a case that the positive excitation is performed, the switch 33d is controlled to become the ON-state, the switch 33b and the switch 33c are controlled to become the OFF-state, and the switch 33a is controlled to repeatedly and alternately become the ON-state and the OFF-state. Specifically, in each period of the PWM control signal C20, the switch 33a is controlled to become the ON-state in only a period prescribed by the duty ratio, and the switch 33a is controlled to become the OFF-state in the other period. On the other hand, in a case that the negative excitation is performed, the switch 33a and the switch 33d are controlled to become the OFF-state, the switch 33c is controlled to become the ON-state, and the switch 33b is controlled to repeatedly and alternately become the ON-state and the OFF-state. The switch 33b is controlled as is the case with the switch 33a during the positive excitation is performed.

If the duty ratio of the PWM control signal C20 is changed in accordance with the signal detected by the current detecting resistance 41, the current value of the exciting current I (average value) is changed in accordance with the change of the duty ratio. By performing the control, the exciting current I flowing through the exciting coil 11 can be controlled to be constant. Because operations other than the operation of the exciting circuit 40 described above is basically the same as the operations of the first embodiment, the description thereof will be omitted.

As described above, in the present embodiment, although the exciting current I flowing through the exciting coil 11 is controlled by the PWM control, it is diagnosed whether the insulation deterioration occurs or not by the same method as the first embodiment. In the present embodiment, although it is necessary to provide the current detecting resistance 41 besides the current detecting resistance 22, the insulation deterioration can be diagnosed without drastically changing the configurations.

Third Embodiment

Figure 6:
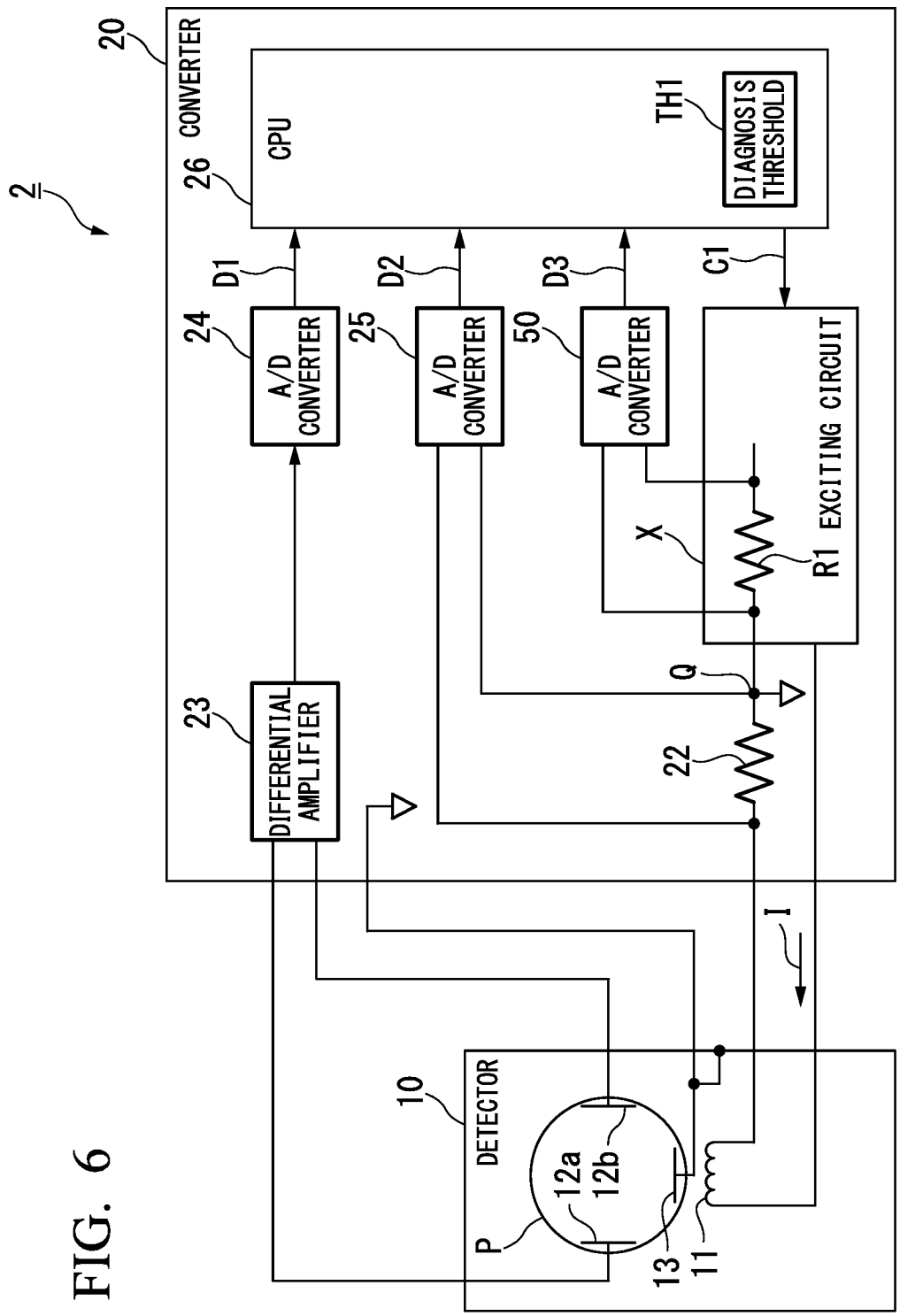
FIG. 6 is a block diagram illustrating a main part of the flowmeter in the third embodiment.

FIG. 6 is a block diagram illustrating a main part of the flowmeter in the third embodiment. Although the insulation deterioration is performed by using the reference exciting current SI (the exciting current I flowing through the exciting coil 11 in a case that the insulation deterioration of the exciting coil 11 does not occur) in the first and second embodiments described above, the insulation deterioration is performed without the reference exciting current SI in the present embodiment. In FIG. 6, parts that correspond to those in FIG. 1 are assigned the same reference numerals, and the descriptions thereof will be omitted.

As shown in FIG. 6, in the flowmeter 2 in the present embodiment, an A/D converter 50 is disposed in the converter 20 in the flowmeter 1 shown in FIG. 1. The exciting circuit X shown in FIG. 6 is the exciting circuit 21 shown in FIG. 1 or the exciting circuit 40 shown in FIG. 5. The resistance R1 in the exciting circuit X is a current detecting resistance (not shown) disposed in the exciting circuit 21 shown in FIG. 1 or the current detecting resistance 41 disposed in the exciting circuit 40 shown in FIG. 5.

The A/D converter 50 converts the exciting current I detected by the current detecting resistance R1 (exactly, voltage generated by the exciting current I flowing through the current detecting resistance R1) to a digital signal. The A/D converter 50 outputs exciting current data D3, which represents the exciting current I flowing through the current detecting resistance R1, to the CPU 26.

In a case that a difference between the exciting current data D2 from the A/D converter 25 and the exciting current data D3 from the A/D converter 50 exceeds a predetermined diagnosis threshold TH1 (threshold), the CPU 26 diagnoses that the insulation deterioration of the exciting coil 11 occurs. The diagnosis threshold TH1 may be the same as the diagnosis threshold TH used in the first and second embodiments, and the diagnosis threshold TH1 may be different from the diagnosis threshold TH used in the first and second embodiments.

The A/D converter 25 and the A/D converter 50 may be communalized. In this case, for example, a multiplexor may select one of the exciting current I detected by the current detecting resistance 22 and the exciting current I detected by the current detecting resistance R1, and the multiplexor may input the selected exciting current I to the communalized A/D converter.

As described above, in both cases of the positive excitation and the negative excitation, whole of the exciting current I flowing from the positive electrode of the exciting power source 31 flows through the current detecting resistance 41 disposed in the exciting circuit 40 shown in FIG. 5. This is the same as the current detecting resistance (not shown) disposed in the exciting circuit 21 shown in FIG. 1. On the other hand, the exciting current I flowing through the current detecting resistance 22 changes in accordance with whether the insulation deterioration of the exciting coil 11 occurs or not. For the reason, the CPU 26 compares the exciting current data D2 with the exciting current data D3 so that the CPU 26 can diagnose whether the insulation deterioration occurs or not.

As described above, in the present embodiment, the CPU 26 calculates the difference between the exciting current data D2 representing the exciting current I flowing through the current detecting resistance 22 and the exciting current data D3 representing the exciting current I flowing through the current detecting resistance R1 disposed in the exciting circuit X. Thereafter, the CPU 26 diagnoses whether the insulation deterioration of the exciting coil 11 occurs or not in accordance with whether the difference exceeds the diagnosis threshold TH1 or not. In the present embodiment, although it is necessary to provide the current detecting resistance R1 and the A/D converter 50 besides the current detecting resistance 22, the insulation deterioration can be diagnosed without drastically changing the configurations.

(Insulation Deterioration Diagnosis System)

Figure 7:
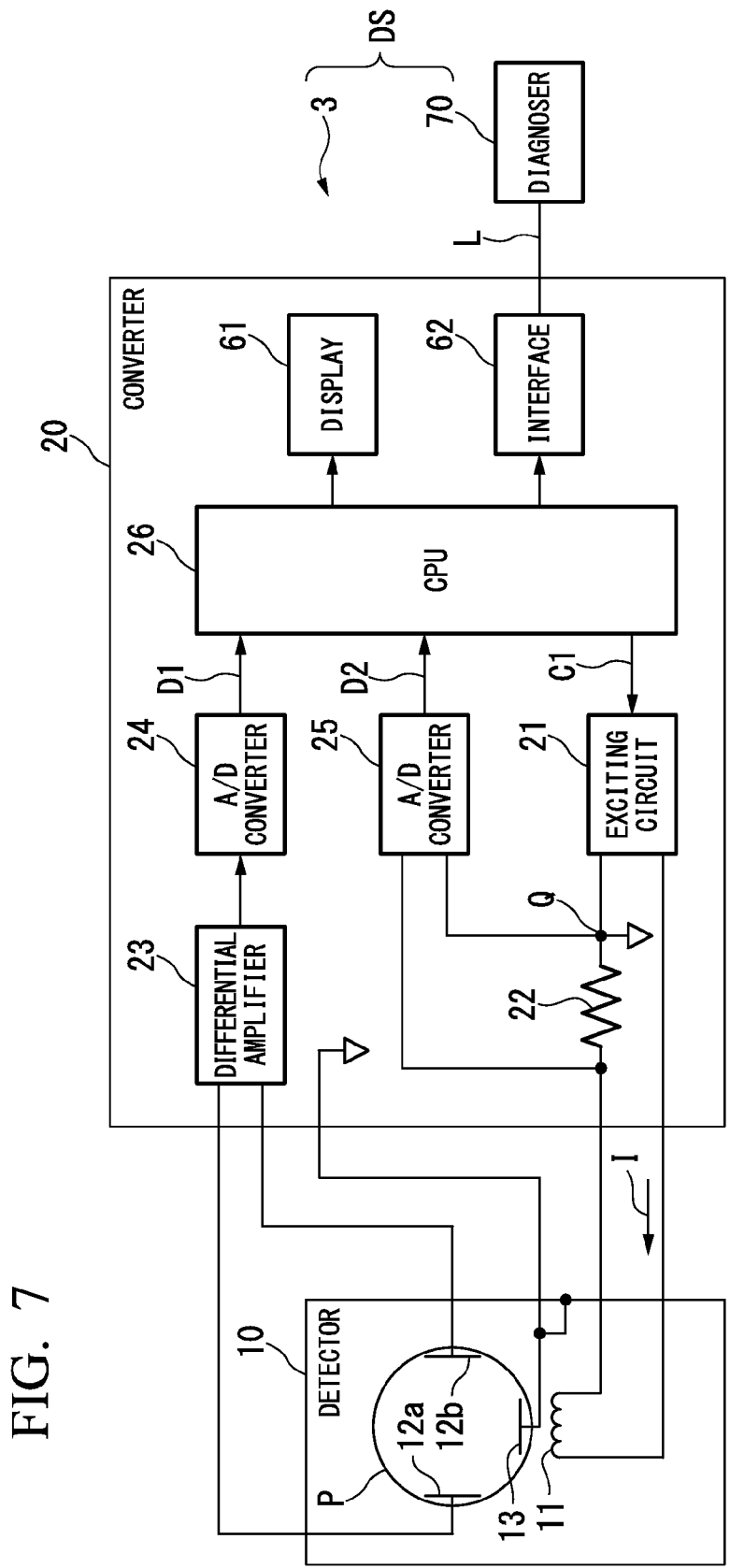
FIG. 7 is a block diagram illustrating a main part of the insulation deterioration diagnosis system.

FIG. 7 is a block diagram illustrating a main part of the insulation deterioration diagnosis system. The insulation deterioration diagnosis system DS in the present embodiment does not diagnose the insulation deterioration of the exciting coil 11 by using only the flowmeter. The insulation deterioration diagnosis system DS diagnoses the insulation deterioration of the exciting coil 11 by using a diagnoser other than the flowmeter. In FIG. 7, parts that correspond to those in FIG. 1 are assigned the same reference numerals, and the descriptions thereof will be omitted.

As shown in FIG. 7, the insulation deterioration diagnosis system DS in the present embodiment has a flowmeter 3 and a diagnoser 70. The flowmeter 3 is a flowmeter which has a display 61 and an interface 62 disposed in the converter 20 in the flowmeter 1 shown in FIG. 1. However, the CPU 26 does not have the function for diagnosing the insulation deterioration of the exciting coil 11. The display 61 has a display device such as a liquid crystal display device, and the display device 61 displays the flow quantity and so on measured by the CPU 26. The interface 62 is connected to the diagnoser 70 via a transmission line L. The interface 62 outputs the exciting current data D2, which is output from the CPU 26, to the diagnoser 70. For example, the transmission line L is a transmission line of two-line type used for transmitting signals which are from 4 [mA] to 20 [mA].

The diagnoser 70 is connected to the interface 62 via the transmission line L. The diagnoser 70 diagnoses whether the insulation deterioration of the exciting coil 11 occurs or not by using the exciting current data D2 output from the interface 62. Specifically, as is the case with the CPU 26 in the first embodiment, in a case that the difference between the exciting current data D2 and the reference exciting current SI exceeds the diagnosis threshold TH, the diagnoser 70 diagnoses that the insulation deterioration of the exciting coil 11 occurs. In this way, in the present embodiment, although it is necessary to change some configurations, the insulation deterioration of the exciting coil 11 can be diagnosed by the diagnoser 70 which is connected to the flowmeter 3.

The insulation deterioration diagnosis system in the present embodiment can be applied to the flowmeters in the second and third embodiments. For example, in a case of applying the insulation deterioration diagnosis system to the flowmeter 2 (shown in FIG. 6) in the third embodiment, the interface 62 is disposed in the converter 20 in the flowmeter 2, and the interface 62 outputs the exciting current data D2 and the exciting current data D3 to the diagnoser 70. The diagnoser 70 may compare the exciting current data D2 with the exciting current data D3 so that the diagnoser 70 can diagnose whether the insulation deterioration occurs or not.

Although the flowmeter, the insulation deterioration diagnosis system, and the insulation deterioration diagnosis method according to embodiments of the present invention have been described above, the present invention is not restricted to the above-described embodiments, and can be freely modified within the scope thereof. For example, although the foregoing descriptions of the embodiments have been examples in which the flowmeter is an electromagnetic flowmeter, the present invention can be applied to a Coriolis-type mass flowmeter. The Coriolis-type mass flowmeter vibrates a tube in which fluid flows, and measures mass flow of the fluid flowing in the tube in accordance with a difference of phases of the detected signals in two points which are different from each other in the tube.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A flowmeter comprising:
an exciter configured to excite fluid which is a measurement target;
a state detector configured to detect a state of the fluid excited by the exciter;
a driver configured to supply exciting current for driving the exciter, the exciting current being an alternating current;
a first current detector that is disposed between the exciter and the driver, the first current detector being configured to detect the exciting current; and
a processor configured to diagnose insulation deterioration of the exciter in accordance with a change of a detection result of the first current detector when the exciting current is supplied from the driver to the exciter.

2. The flowmeter according to claim 1, wherein
the processor is configured to measure flow quantity of the fluid by using a detection result of the state detector, and
the processor is configured to correct the flow quantity of the fluid by using the detection result of the first current detector.

3. The flowmeter according to claim 1, wherein
the processor stores, as a reference exciting current, an exciting current which is supplied to the exciter when the insulation deterioration of the exciter does not occur, and
in a case that a difference between the detection result of the first current detector and the reference exciting current exceeds a predetermined threshold, the processor is configured to diagnose that the insulation deterioration of the exciter occurs.

4. The flowmeter according to claim 1, wherein
the exciter comprises an exciting coil which excites the fluid, and
the state detector comprises detecting electrodes which detect electromotive force generated by the fluid excited by the exciting coil.

5. The flowmeter according to claim 4, wherein
the driver is configured to supply the alternating current to the exciting coil in a positive direction and a negative direction alternately, and
in both cases of supplying the alternating current in the positive direction and supplying the alternating current in the negative direction, the processor is configured to diagnose the insulation deterioration.

6. A flowmeter comprising:
an exciter configured to excite fluid which is a measurement target;
a state detector configured to detect a state of the fluid excited by the exciter;
a driver configured to supply exciting current for driving the exciter;
a first current detector that is disposed between the exciter and the driver, the first current detector being configured to detect the exciting current; and
a processor configured to diagnose insulation deterioration of the exciter in accordance with a change of a detection result of the first current detector,
wherein the driver comprises:

a second current detector configured to detect the exciting current; and
a current controller configured to control a magnitude of the exciting current in accordance with a detection result of the second current detector, and
wherein, in a case that a difference between the detection result of the first current detector and the detection result of the second current detector exceeds a predetermined threshold, the processor is configured to diagnose that the insulation deterioration of the exciter occurs.

7. A flowmeter comprising:
an exciter configured to excite fluid which is a measurement target;
a state detector configured to detect a state of the fluid excited by the exciter;
a driver configured to supply exciting current for driving the exciter;
a first current detector that is disposed between the exciter and the driver, the first current detector being configured to detect the exciting current;
a processor configured to diagnose insulation deterioration of the exciter in accordance with a change of a detection result of the first current detector; and
a reference electrode configured to prescribe a reference electrical potential of the electromotive force,
wherein the exciter comprises an exciting coil which excites the fluid,
wherein the state detector comprises detecting electrodes which detect electromotive force generated by the fluid excited by the exciting coil, and
wherein electrical potential of a connecting point between the driver and the first current detector is the same as electrical potential of the reference electrode.

8. An insulation deterioration diagnosis system comprising:
a flowmeter that comprises:
an exciter configured to excite fluid which is a measurement target;
a state detector configured to detect a state of the fluid excited by the exciter;
a processor configured to measure flow quantity of the fluid by using a detection result of the state detector;
a driver configured to supply exciting current for driving the exciter, the exciting current being an alternating current;
a first current detector that is disposed between the exciter and the driver, the first current detector being configured to detect the exciting current; and
an interface configured to output a detection result of the first current detector to outside of the flowmeter; and
a diagnoser configured to diagnose insulation deterioration of the exciter in accordance with a change of the detection result of the first current detector output from the flowmeter when the exciting current is supplied from the driver to the exciter.

9. The insulation deterioration diagnosis system according to claim 8, wherein
the processor is configured to measure flow quantity of the fluid by using a detection result of the state detector, and
the processor is configured to correct the flow quantity of the fluid by using the detection result of the first current detector.

10. The insulation deterioration diagnosis system according to claim 8, wherein
the diagnoser stores, as a reference exciting current, an exciting current which is supplied to the exciter when the insulation deterioration of the exciter does not occur, and
in a case that a difference between the detection result of the first current detector and the reference exciting current exceeds a predetermined threshold, the diagnoser is configured to diagnose that the insulation deterioration of the exciter occurs.

11. The insulation deterioration diagnosis system according to claim 8, wherein
the exciter comprises an exciting coil which excites the fluid, and
the state detector comprises detecting electrodes which detect electromotive force generated by the fluid excited by the exciting coil.

12. The insulation deterioration diagnosis system according to claim 11, wherein
the driver is configured to supply the alternating current to the exciting coil in a positive direction and a negative direction alternately, and
in both cases of supplying the alternating current in the positive direction and supplying the alternating current in the negative direction, the diagnoser is configured to diagnose the insulation deterioration.

13. An insulation deterioration diagnosis system comprising:
a flowmeter that comprises:
an exciter configured to excite fluid which is a measurement target;
a state detector configured to detect a state of the fluid excited by the exciter;
a processor configured to measure flow quantity of the fluid by using a detection result of the state detector;
a driver configured to supply exciting current for driving the exciter;
a first current detector that is disposed between the exciter and the driver, the first current detector being configured to detect the exciting current; and
an interface configured to output a detection result of the first current detector to outside of the flowmeter; and
a diagnoser configured to diagnose insulation deterioration of the exciter in accordance with a change of the detection result of the first current detector output from the flowmeter,
wherein the driver comprises:
a second current detector configured to detect the exciting current; and
a current controller configured to control a magnitude of the exciting current in accordance with a detection result of the second current detector,
in a case that a difference between the detection result of the first current detector and the detection result of the second current detector exceeds a predetermined threshold, the diagnoser is configured to diagnose that the insulation deterioration of the exciter occurs.

14. An insulation deterioration diagnosis system comprising:
a flowmeter that comprises:
an exciter configured to excite fluid which is a measurement target;
a state detector configured to detect a state of the fluid excited by the exciter;
a processor configured to measure flow quantity of the fluid by using a detection result of the state detector;

a driver configured to supply exciting current for driving the exciter;
a first current detector that is disposed between the exciter and the driver, the first current detector being configured to detect the exciting current; and
an interface configured to output a detection result of the first current detector to outside of the flowmeter;
a diagnoser configured to diagnose insulation deterioration of the exciter in accordance with a change of the detection result of the first current detector output from the flowmeter; and
a reference electrode configured to prescribe a reference electrical potential of the electromotive force,
wherein the exciter comprises an exciting coil which excites the fluid,
wherein the state detector comprises detecting electrodes which detect electromotive force generated by the fluid excited by the exciting coil, and
wherein electrical potential of a connecting point between the driver and the first current detector is the same as electrical potential of the reference electrode.

15. An insulation deterioration diagnosis method comprising:
exciting, by an exciter, fluid which is a measurement target;
detecting, by a state detector, a state of the fluid excited by the exciter;
supplying, by a driver, exciting current for driving the exciter, the exciting current being an alternating current;
detecting the exciting current by a first current detector that is disposed between the exciter and the driver; and
diagnosing, by a processor, insulation deterioration of the exciter in accordance with a change of a detection result of the first current detector when the exciting current is supplied from the driver to the exciter.

16. The insulation deterioration diagnosis method according to claim 15, further comprising:
measuring, by the processor, flow quantity of the fluid by using a detection result of the state detector, and
correcting, by the processor, the flow quantity of the fluid by using the detection result of the first current detector.

17. The insulation deterioration diagnosis method according to claim 15, further comprising:
storing, by the processor, as a reference exciting current, an exciting current which is supplied to the exciter when the insulation deterioration of the exciter does not occur, and
diagnosing, by the processor, that the insulation deterioration of the exciter occurs, in a case that a difference between the detection result of the first current detector and the reference exciting current exceeds a predetermined threshold.

18. The insulation deterioration diagnosis method according to claim 15, wherein
the exciter comprises an exciting coil which excites the fluid, and
the state detector comprises detecting electrodes which detect electromotive force generated by the fluid excited by the exciting coil.

19. The insulation deterioration diagnosis method according to claim 18, further comprising:
supplying, by the driver, the alternating current to the exciting coil in a positive direction and a negative direction alternately, and
diagnosing, by the processor, the insulation deterioration, in both cases of supplying the alternating current in the positive direction and supplying the alternating current in the negative direction.

20. An insulation deterioration diagnosis method comprising:
exciting, by an exciter, fluid which is a measurement target;
detecting, by a state detector, a state of the fluid excited by the exciter;
supplying, by a driver, exciting current for driving the exciter;
detecting the exciting current by a first current detector that is disposed between the exciter and the driver; and
diagnosing, by a processor, insulation deterioration of the exciter in accordance with a change of a detection result of the first current detector,
wherein the driver comprises:
a second current detector configured to detect the exciting current; and
a current controller configured to control a magnitude of the exciting current in accordance with a detection result of the second current detector,
the insulation deterioration diagnosis method further comprises:
diagnosing, by the processor, that the insulation deterioration of the exciter occurs, in a case that a difference between the detection result of the first current detector and the detection result of the second current detector exceeds a predetermined threshold.

21. An insulation deterioration diagnosis method comprising:
exciting, by an exciter, fluid which is a measurement target;
detecting, by a state detector, a state of the fluid excited by the exciter;
supplying, by a driver, exciting current for driving the exciter, the exciting current being an alternating current;
detecting the exciting current by a first current detector that is disposed between the exciter and the driver;
diagnosing, by a processor, insulation deterioration of the exciter in accordance with a change of a detection result of the first current detector when the exciting current is supplied from the driver to the exciter; and
prescribing, by a reference electrode, a reference electrical potential of the electromotive force,
wherein the exciter comprises an exciting coil which excites the fluid,
wherein the state detector comprises detecting electrodes which detect electromotive force generated by the fluid excited by the exciting coil, and
wherein electrical potential of a connecting point between the driver and the first current detector is the same as electrical potential of the reference electrode.

* * * * *